(12) United States Patent
Kabatek

(10) Patent No.: US 7,027,835 B2
(45) Date of Patent: Apr. 11, 2006

(54) EXTERNAL OPERATING UNIT FOR A MOBILE RADIO TELEPHONE

(75) Inventor: Ulrich Kabatek, Babenhausen (DE)

(73) Assignee: Siemens AG, (DE)

( * ) Notice: Subject to any disclaimer, the term of this patent is extended or adjusted under 35 U.S.C. 154(b) by 842 days.

(21) Appl. No.: 09/892,220

(22) Filed: Jun. 25, 2001

(65) Prior Publication Data

US 2002/0042289 A1 Apr. 11, 2002

(30) Foreign Application Priority Data

Jun. 21, 2000 (DE) ................. 100 30 609

(51) Int. Cl.
*H04M 1/00* (2006.01)

(52) U.S. Cl. ..................... 455/557; 455/420

(58) Field of Classification Search ........ 455/418, 455/551, 552.1, 553.1, 557, 419, 420
See application file for complete search history.

(56) References Cited

U.S. PATENT DOCUMENTS

| | | | |
|---|---|---|---|
| 5,062,132 A * | 10/1991 | Yasuda et al. .............. 455/557 |
| 5,249,218 A * | 9/1993 | Sainton ...................... 455/418 |
| 5,479,479 A | 12/1995 | Braitberg et al. |
| 5,636,140 A * | 6/1997 | Lee et al. ................... 370/469 |
| 6,041,229 A * | 3/2000 | Turner ....................... 455/420 |
| 6,377,825 B1 * | 4/2002 | Kennedy et al. ......... 455/569.2 |
| 6,529,724 B1 * | 3/2003 | Khazaka et al. ............ 455/405 |
| 6,629,183 B1 * | 9/2003 | Gortz et al. ................ 710/305 |
| 6,763,247 B1 * | 7/2004 | Hollstrom et al. ....... 455/556.1 |
| 2002/0004386 A1 * | 1/2002 | Simon ........................ 455/419 |

FOREIGN PATENT DOCUMENTS

EP 0 996 267 A2 4/2000

* cited by examiner

*Primary Examiner*—Bing Q. Bui
(74) *Attorney, Agent, or Firm*—Mayer, Brown, Rowe & Maw LLP

(57) ABSTRACT

An operating unit for a mobile radio telephone comprising: a housing separate from a mobile radio telephone unit which may be in data communication with the mobile radio telephone; a first set of standardized functions for mobile radio telephones which includes the functions for setting up a fixed data link and for transmitting an identity attribute of the mobile radio telephone stored in a memory module of the housing; and a library containing a second set of specialized functions for the mobile radio telephone which can be stored in the memory module of the housing.

22 Claims, 2 Drawing Sheets

EXTERNAL OPERATING UNIT FOR A MOBILE RADIO TELEPHONE

BACKGROUND OF THE INVENTION

1. Field of the Invention

The invention relates to an operating unit for a mobile radio telephone, where the operating unit is constructed separately from the mobile radio telephone and can be connected to the mobile radio telephone. The invention also relates to a method for updating instruction functions of an external operating unit for operating a mobile radio telephone.

2. Description of the Related Art

From German Patent Application 99 21 533.2 of the applicant, which has not been previously published, a communication system of a motor vehicle is known which contains a mobile radio telephone and an audio and/or information system installed in a motor vehicle. The mobile radio telephone can be operated via the operating unit of the audio and/or information system so that a hands-free function can be implemented. In this arrangement, call transmission and/or data transmission between the mobile radio telephone and the audio and/or information system takes place via a wireless connection.

From the journal ADAC Motorwelt, March 1999 edition, a Telematik Service Kit is known in which breakdown assistance can be requested, an emergency call sent out or traffic information requested via various keys via an additional device which can be connected to a mobile radio telephone. This additional device thus also represents an external operating unit for certain functions of a mobile radio telephone. As can be seen from this publication, the additional device can only be used with certain types of mobile radio telephones. In particular, the problem arises that when a user of this Telematik Service Kit procures a new mobile radio telephone, he cannot continue to use the external operating unit already in existence since this is only equipped for operation with fixed types of mobile radio telephones.

In the meantime, mobile radio telephones are being offered via which Internet access is possible. The user thus has the capability of searching through the offers of the Internet and to download information from the Internet via the mobile radio telephone independently of a telephone land line. The Internet is accessed in accordance with the WAP (wireless application protocol) standard. The WAP is the common standard of the communications industry for transmitting specially prepared Internet pages to mobile radio telephones. Future mobile radio generations can also operate in accordance with the new UMTS (Universal Mobile Telecommunications System) standard. The UMTS is a mobile radio standard which provides for data transmission at up to 200-times the speed of the conventional networks.

It can be seen from the above description that the further development of mobile radio telephones will lead to new generations of devices with an altered range of functions at short intervals even in the future. However, corresponding modern mobile radio telephones with expanded functionality cannot be combined with existing external operating units existing, in particular, in motor vehicles. This forms the basis for the present invention which has the object of specifying an operating device which can be adapted to the different functionalities of various mobile radio telephones in a simple manner.

SUMMARY OF THE INVENTION

The object is achieved by an operating unit for a mobile radio telephone, in which the operating unit is constructed separately from the mobile radio telephone and can be connected to the mobile radio telephone, a first set of standardized functions for mobile radio telephones which contains the functions for setting up a fixed data link and for transmitting an identity attribute of the mobile radio telephone, is stored in a memory module of the operating unit outside the mobile radio telephone, a library containing a second set of specialized functions of the mobile radio telephone can be loaded into the operating unit and can be stored in the memory module of the operating unit.

Whereas known operating units are designed for operation with certain types of mobile radio telephones where the mobile radio telephones, naturally, can only be those which were already available on the market at the time of the sale of the operating unit, the operating unit according to the invention also guarantees operation with future mobile radio types. In a memory module of the operating unit, a first set of standardized functions for mobile radio telephones is stored which only comprises a few standard functions. This includes the functions for setting up a fixed data link and for transmitting an identity attribute of the mobile radio telephone. The identity attribute is an attribute which clearly identifies the type of the mobile radio telephone connected. This can be, for example, the precise type designation of the mobile radio telephone or also a code number. If then a new mobile radio telephone is connected to the operating unit, where the specialized functions of this new mobile radio telephone exceed the abovementioned basic functions, a library containing a second set of the specialized functions of the mobile radio telephone is loaded into the operating unit and stored in the memory module of the operating unit. The new mobile radio telephone can then be operated with all its functions via the external operating unit.

In particular, the operating unit has a control module with a program, which is generally called a browser, for accessing files of a generally accessible external computer system, especially the Internet, via a radio link of the mobile radio telephone. In this arrangement, it is possible to access files of the Internet in a familiar manner via such a browser, the connection to an Internet provider being provided by a radio link of the mobile radio telephone. The consequence is that it becomes possible to load the second set of specialized functions from an external database and, in this case, especially via the Internet, by means of the radio link in a particularly simple manner. Corresponding information on the specialized functions can be made available for the customers in the Internet by the mobile radio manufacturers as is already the case today for other application programs such as, for example, printer drivers.

In principle, it is possible to integrate only the essential modules for the data transmission into the mobile radio telephone but the mobile radio telephone is preferably a mobile radio telephone which can be operated without the external operating unit. For this purpose, another display and operating unit is integrated into the mobile radio telephone. To this extent, this is a known, commercially available mobile radio telephone. In particular, the operating unit according to the invention for a mobile radio telephone can be permanently installed in a motor vehicle and can also be used as hands-free device in this arrangement.

In particular, the operating unit can be installed as an independent device in the motor vehicle, particularly in an indicating instrument of the vehicle or in the dashboard. In addition, the operating unit according to the invention can also be integrated in another component of the motor vehicle. This can be, in particular, a car radio, a navigation system or a multimedia system. Operating and display elements of these components can then also be used for the operating unit according to the invention, resulting in a cost advantage.

According to a further embodiment of the invention, the mobile radio telephone can also be permanently installed in a motor vehicle where the operating unit can be, in particular, a mobile operating unit such as, for example, a notebook or a PDA (personal digital assistant).

The connection between the operating unit and the mobile radio telephone can be effected via a wire-connected link. However, a wireless link between the operating unit and the mobile radio telephone is particularly preferred, especially a wireless short-distance radio link as is described in the German Patent Application 199 21 533.2 initially mentioned, especially in accordance with the Bluetooth standard. The browser which is preferably present in the display unit is, in particular, a WAP browser. This provides Internet access by means of the operating unit via the WAP standard. The browser preferably uses the WML and WMLscript protocols or languages, respectively. These are standardized protocols and languages, respectively, which are analogous to the HTML and Java Script protocols and languages, respectively, present in Internet land line links. However, the invention is not restricted to the use of a WAP browser so that, in particular, future standards can also be used.

The aforementioned standardized basic functions which are permanently stored in the operating unit are, in particular, functions which are a component of the standardized AT+C instruction set.

A method according to the invention for updating instruction functions of an external operating unit for operating a mobile radio telephone, in which a first set of standardized functions which contains the functions for setting up a fixed data link and for transmitting an identity attribute of the mobile radio telephone is stored in a memory module associated with the operating unit, exhibits the following method steps:

interrogating the identity attribute of the mobile radio telephone by means of a control module of the operating unit, determining, by means of the identity attribute, whether a second set of specialized functions of the mobile radio telephone is stored in the operating unit for the mobile radio telephone, if no second set of specialized functions is stored for the mobile radio telephone:

automatically establishing a radio link to an external database by means of the mobile radio telephone, transmitting the identity attribute of the mobile radio telephone to the external database, selecting the second set of specialized functions for the mobile radio telephone from the database, transmitting the second set of specialized functions to the operating unit, storing the second set of specialized functions outside the mobile radio telephone in the memory module associated with the operating unit.

In particular, storing the second set of specialized functions can be permanent. As an alternative, however, the second set of specialized functions can also be stored only temporarily so that it or parts thereof are always currently loaded via the mobile radio link. This ensures regular updating of the specialized functions and thus of the range of functions of the mobile radio telephone. If necessary, a reference to the functions which must always be currently loaded is stored.

BRIEF DESCRIPTION OF THE DRAWINGS

In the text which follows, the invention will be explained in greater detail by means of an exemplary embodiment and with reference to the drawing, in which.

DETAILED DESCRIPTION OF THE PRESENTLY PREFERRED EMBODIMENTS

Figure 1:
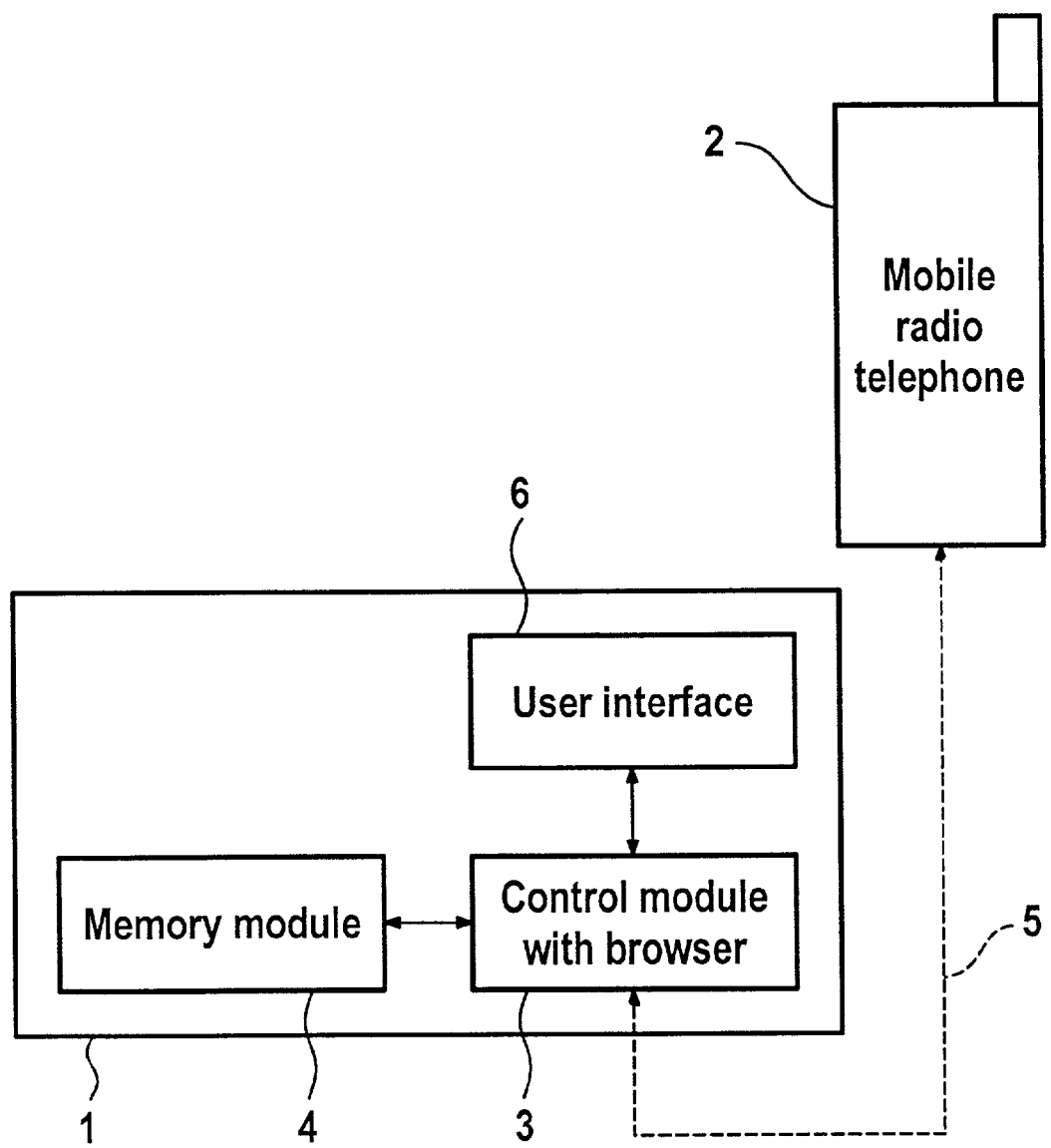
FIG. 1 shows a block diagram of the operating unit and of the mobile radio telephone.

FIG. 1 shows a block diagram of the operating unit 1 which is connected to a mobile radio telephone 2. The operating unit 1 contains a control module 3 with a WAP browser. In this exemplary embodiment, the browser uses the WML and WMLscript protocols and languages, respectively. The browser provides access to the Internet and data transmission from and to the Internet by means of a mobile radio link via the mobile radio telephone 2. For this purpose, a connection is established to an Internet provider in a known manner.

The control module 3 is connected to a memory module 4. A first set of standardized functions for mobile radio telephones is stored in the memory module 4. This first set of standardized functions is a part of the so-called AT+C instruction set. This set of standardized functions contains at least the functions for setting up a fixed data link and for transmitting an identity attribute of the mobile radio telephone. In addition, further specialized functions of the mobile radio telephone 2 are stored in the memory module. Thus, the full range of functions of the mobile radio telephone 2 can be used via the operating unit 1.

The control module 3 is also connected to a user interface 6. The user interface 6 contains an input unit and an output unit. The input unit can be, in particular, a keypad. The output unit is, in particular, a visual output unit. The input and output unit can be combined with one another, for example in the form of a touch screen. Thus, Internet pages can be called up with the aid of the browser in the control module 3 and the mobile radio telephone 2 and files can be downloaded from the Internet in a familiar manner via the user interface 6.

The operating unit 1 and the mobile radio telephone 2 are connected to one another via the link 5. The link 5 can be both a wire-connected link and a wireless link. If it is a wireless link, in particular, a short-distance radio link between the operating unit 1 and the mobile radio telephone 2 is preferred, for example in accordance with the Bluetooth standard. In this case, both the operating unit 1 and the mobile radio telephone 2 contain corresponding transceiver devices. Furthermore, the connection between the operating unit 1 and the mobile radio telephone 2 can also be made via an optical link, especially an infrared link. In this case, corresponding infrared transceiver modules must be provided in the operating unit 1 and in the mobile radio telephone 2. In particular, the operating unit 1 can also have a number of the said possible links so that both a wire-connected link and a wireless link to corresponding mobile radio telephones is ensured.

Figure 2:
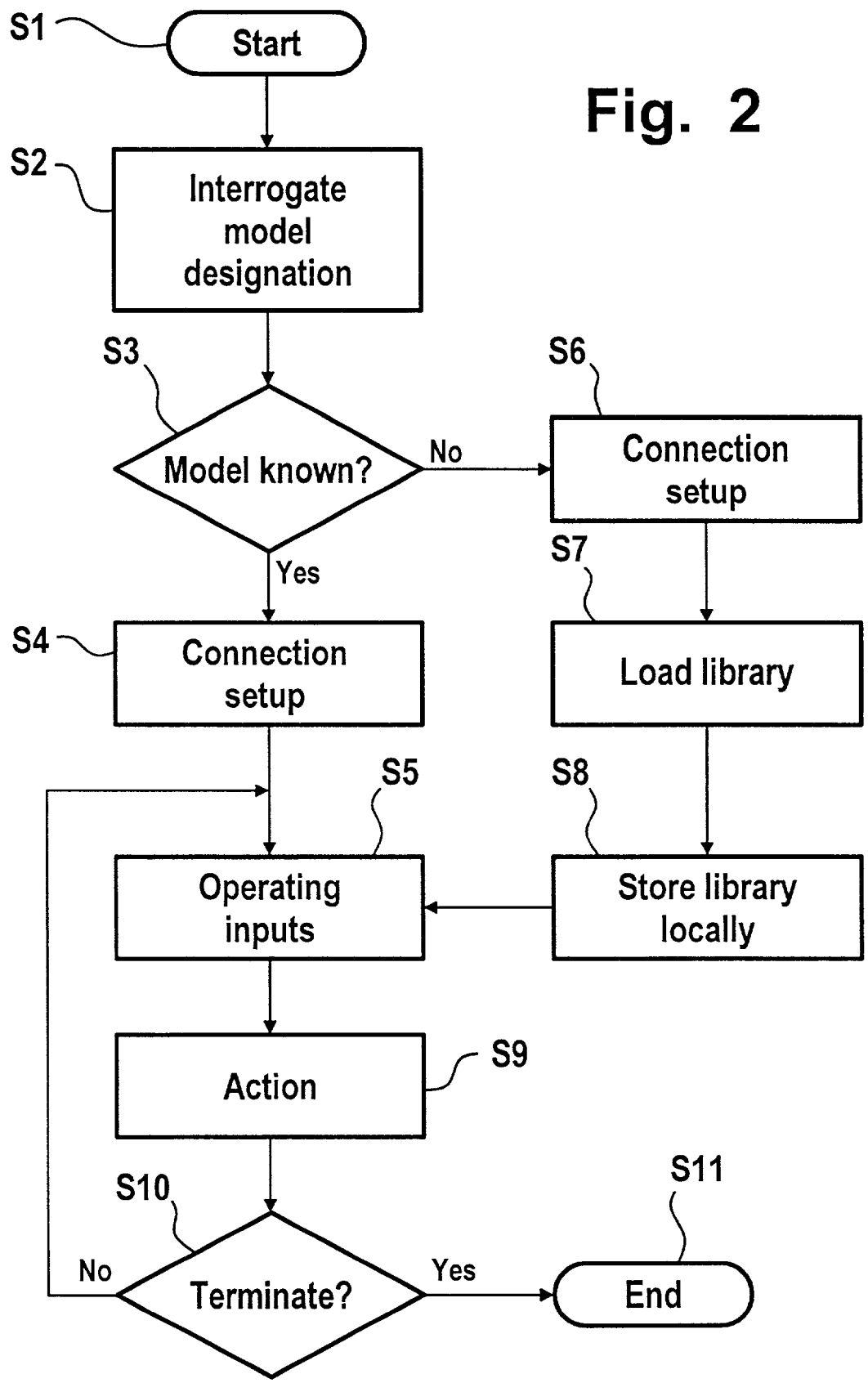
FIG. 2 shows a flow chart.

If then a new mobile radio telephone is connected to the operating unit 1, for which the specialized functions have not yet been stored in the memory module 4 of the operating unit 1, the libraries needed are loaded into the memory module 4 from the Internet by means of a second set of specialized functions of the mobile radio telephone. The essential steps of the method executed during the process will be explained in the text which follows, referring to FIG. 2.

After the devices have been switched on in step S1, the module designation of the connected mobile radio device is first interrogated by the control module 3 of the operating unit 1 in step S2. This can be, in particular, a coded model designation. In step S3, a check is made whether this is a known model, i.e. whether a library with specialized functions of the connected mobile radio telephone is stored in memory module 4. If this is so, the connection can be set up directly in step S4 and in step S5, the user can make his operating inputs. The actions associated with the operating inputs are executed in step S9. In step S10, a check is made whether the connection is to be terminated. If this is so, the connection is dropped in step S11. If not, new operating inputs can be made in step S5.

If it is found in step S3, in contrast, that no library of specialized functions is stored for the mobile radio telephone in memory module 4, a connection from the mobile radio telephone to an Internet provider will first be set up in step S6. This connection set up is possible since the mobile radio telephone has at least a first set of standardized functions which is also stored in the memory module 4. These functions are the functions for setting up a fixed data link and for transmitting an identity attribute of the mobile radio telephone. The last-mentioned function has already been needed in step S2 for interrogating the model designation. In step S6, then, the Internet provider is accessed via the standardized function for setting up a fixed data link. In step S7, finally, a library containing a second step of specialized functions of the mobile radio telephone is loaded from the Internet. Step S7 comprises a number of substeps which, in particular, comprises the transmission of the identity attribute of the mobile radio telephone such as, for example, a coded model designation, to an Internet database, and a search for searching for the library belonging to this mobile radio telephone and containing a second set of specialized functions of the mobile radio telephone. After that, the selected library is transmitted to the operating unit 1. In step S8, the library thus loaded is stored in the memory module 4 of the operating unit 1. The memory module 4 contains corresponding memory elements which can be written to for this purpose. After that, the usual operating inputs can be made in a familiar manner in step S5. After this process, the specialized functions of this mobile radio telephone are now located in the operating unit 1, so that the process described of loading the library is only required when a new mobile radio type is connected to the operating unit 1 for the first time.

The operating unit according to the invention and the method according to the invention, respectively, thus open the possibility of also using an existing operating unit, especially an operating unit for mobile radio telephones arranged in a vehicle, with mobile radio telephones with new specialized functions which has newly come on the market.

What is claimed is:

1. An operating unit for a mobile radio telephone, comprising:
    a housing separate from the mobile radio telephone;
    a first set of standardized functions for the mobile radio telephone which includes the functions for setting up a fixed data link and for transmitting an identity attribute of the mobile radio telephone stored in a memory module of the housing;
    a library containing a second set of specialized functions for the mobile radio telephone which can be stored in the memory module of the housing.

2. The operating unit as claimed in claim 1 further comprising a control module, wherein the control module containing software for accessing files of a generally accessible external computer system is integrated into the housing via a radio link with the mobile radio telephone.

3. The operating unit as claimed in claim 1, wherein the second set of specialized functions can be loaded by a radio link from an external database.

4. The operating unit as claimed in claim 1, wherein the operating unit is integrated into the mobile radio telephone.

5. The operating unit as claimed in claim 2 further comprising a browser in the housing, wherein the browser is a wireless application protocol browser.

6. The operating unit as claimed in claim 5, wherein the browser uses wireless markup language and/or wireless markup language script standards.

7. The operating unit as claimed in claim 1, wherein standardized functions are a component of the standardized AT+C instruction set.

8. The operating unit as claimed in claim 1, wherein the housing is incorporated into an indicating instrument of the vehicle.

9. The operating unit as claimed in claim 1, wherein the housing further includes a car radio.

10. The operating unit as claimed in claim 1, wherein the housing further includes a navigation system.

11. The operating unit as claimed in claim 1, wherein the housing is connected to the mobile radio telephone via a wire-connected link.

12. The operating unit as claimed in claim 1, wherein the housing is connected to the mobile radio telephone via a wireless link.

13. The operating unit as claimed in claim 12, wherein the connection between the housing and the mobile radio telephone is a short-distance radio link.

14. The operating unit as claimed in claim 13, wherein the short-distance radio link is a Bluetooth standard connection.

15. A method for updating instruction functions of a separate external housing for a mobile radio telephone system, in which a first set of standardized functions which contains the functions for setting up a fixed data link and for transmitting an identity attribute of the mobile radio telephone, is stored in a memory module associated with the separate housing unit, comprising the steps of:
    determining an identity attribute of the mobile radio telephone,
    determining, based on the identity attribute, whether a second set of specialized functions for the mobile radio telephone is stored in the separate housing of the mobile radio telephone system,
    if no second set of specialized functions is stored for the mobile radio telephone;
    automatically establishing a radio link to an external database with the mobile radio telephone,
    transmitting the identity attribute of the mobile radio telephone to the external database,
    selecting a second set of specialized functions for the mobile radio telephone from the database,
    transmitting the second set of specialized functions to the housing; and
    storing the second set of specialized functions outside the mobile radio telephone in the memory module associated with the separate housing.

16. The method as claimed in claim 15, wherein the second set of specialized functions is loaded from the external database via the Internet.

17. The method as claimed in claim 16, wherein the connection to the Internet is effected via a program, which is executable in a control module of the housing unit.

18. The method as claimed in claim 17, wherein the connection to the Internet is effected via a wireless application protocol browser.

19. The method as claimed in claim 18, wherein the browser uses the wireless markup language and/or wireless markup language script standards.

20. The method as claimed in claim 15, wherein the standardized functions are part of the AT+C instruction set.

21. The method as claimed in claim 15, wherein a wire-connected link is effected between the operating unit and the mobile radio telephone.

22. The method as claimed in claim 15, wherein a short-distance radio link is effected between the separate housing and the mobile radio telephone.

* * * * *

UNITED STATES PATENT AND TRADEMARK OFFICE
CERTIFICATE OF CORRECTION

PATENT NO. : 7,027,835 B2
APPLICATION NO. : 09/892220
DATED : Aprill 11, 2006
INVENTOR(S) : Ulrich Kabatek It is certified that error appears in the above-identified patent and that said Letters Patent is hereby corrected as shown below:

On the title page item [30],
"100 30 609" should read --100 30 603

Signed and Sealed this

Twenty-ninth Day of August, 2006

JON W. DUDAS
*Director of the United States Patent and Trademark Office*